United States Patent [19]
Rolando

[11] Patent Number: 5,947,228
[45] Date of Patent: Sep. 7, 1999

[54] HYDRAULIC POWER STEERING SYSTEM FOR A VEHICLE

[75] Inventor: Adriano Rolando, Rivarolo, Italy

[73] Assignee: Dayco Europe S.p.A., Turin, Italy

[21] Appl. No.: 08/695,289

[22] Filed: Aug. 9, 1996

[30] Foreign Application Priority Data

Aug. 11, 1995 [IT] Italy .................... TO95A0683

[51] Int. Cl.$^6$ .................................................. B62D 5/06
[52] U.S. Cl. ........................ 180/417; 60/384; 180/441; 180/442
[58] Field of Search ................................ 180/417, 421, 180/426, 438, 441; 60/384

[56] References Cited

U.S. PATENT DOCUMENTS

| | | | |
|---|---|---|---|
| 4,914,913 | 4/1990 | St. Germain et al. | 180/441 |
| 5,072,586 | 12/1991 | Fassbender | 180/441 |
| 5,253,730 | 10/1993 | Hayashi et al. | 180/417 |
| 5,505,276 | 4/1996 | Luibrand | 180/417 |
| 5,762,159 | 6/1998 | Matsuoka et al. | 180/417 |

FOREIGN PATENT DOCUMENTS

| | | |
|---|---|---|
| 0067320 | 12/1982 | European Pat. Off. . |
| 0562426 | 9/1993 | European Pat. Off. . |
| 2850526 | 5/1980 | Germany . |

OTHER PUBLICATIONS

Hans Esders; Elektrohydraulisches . . . Mobilhydraulik; 1994; pp. 473–480.

*Primary Examiner*—Anne Marie Boehler
*Attorney, Agent, or Firm*—Robert W. Becker & Associates

[57] ABSTRACT

A hydraulic power steering system for a vehicle comprising a hydraulic fluid displacement pump, operated by a thermal engine of the vehicle and provided with a suction port and a delivery port, a reservoir for collecting said fluid, connected to suction port, a double-acting hydraulic cylinder, capable of controlling direction of front wheels of the vehicle, and a distribution unit fitted with an inlet port, connected to delivery port, a vent port, connected to reservoir and two service ports, connected to respective chambers of hydraulic cylinder; distribution unit comprising a first and a second distributor, respectively controlled by hydraulic cylinder and by a steering wheel of the vehicle and movable with respect to each other; pump being of the variable displacement type and system further comprising a flow request sensor from and to chambers of cylinder and a device for adjusting displacement of pump, controlled by sensor.

15 Claims, 9 Drawing Sheets

HYDRAULIC POWER STEERING SYSTEM FOR A VEHICLE

BACKGROUND OF THE INVENTION

The present invention relates to a hydraulic power steering system for a vehicle, in particular for a motor vehicle.

The known hydraulic power steering systems essentially comprise a constant displacement pump, operated by a thermal engine of the vehicle and comprising a suction port and a pressurized oil delivery port, an oil reservoir connected to the pump suction port, a double-acting hydraulic cylinder capable of controlling direction of the vehicle front wheels, and a distribution unit controlled by a steering wheel of the vehicle and comprising an inlet port connected to the pump's delivery port, a vent port connected to the fuel tank and two service ports connected to the respective chambers of the hydraulic cylinder.

The pump comprises a pumping unit and a valve for adjusting the flow rate from said pump to prevent oversizing of pipes and difficult checking of the oil flow circulating in the system. Said valve is designed so as to allow a constant oil flow rate to be displaced towards the distribution unit, equal to the flow rate pumped by the pumping unit at a rotation speed corresponding to the thermal engine's minimum r.p.m.; the difference in the flow rate produced by the pumping unit at higher rotation speeds being circulated back into the pump.

The distribution unit further comprises an outer distributor, rotating about its axis and controlled by the hydraulic cylinder through a rack-pinion coupling, and an inner distributor, connected to the steering wheel and rotating with the latter about its axis with respect to the outer distributor, to unbalance the oil pressures in the outlet ducts and activate the hydraulic cylinder; the latter causes the outer distributor to rotate, tending to follow the inner distributor's rotation, so as to cancel the angular displacement between the said distributors and, consequently, oil flow from and to the cylinder chambers, upon the steering wheel reaching a static position.

However, the systems of the type briefly described hereinabove have a number of drawbacks.

Pump displacement must be so designed, that both oil delivery and pressure in the hydraulic power steering system can be such, as to guarantee good vehicle maneuverability in the maximum performance, for example when quickly steering to park the vehicle from a still condition thereof and minimum r.p.m.

Therefore, it is clear that in no further condition of use is the oil volume displaced by the pump exploited, thus causing energy dissipation. In particular, when the vehicle is travelling on motorways at high speeds, with minimal steering wheel movements, the energy dissipated by the hydraulic power steering system is quite high, in that the pump is dragged by the engine at a higher rotation speed, with respect to the engine's minimum r.p.m., thus causing large oil flows to be delivered by the pump and mostly circulated back into the pump itself.

Furthermore, the difference between the power absorbed by the pump and the power used by both distribution unit and hydraulic cylinder is continuously dissipated and converted into heat, causing oil overheating problems, as well as limited life of both hydraulic system components and oil.

Finally, said overheating favors noise problems, during lamination of oil flow rate in the system.

SUMMARY OF THE INVENTION

Aim of the present invention is the embodiment of a hydraulic power steering system for a vehicle, which may overcome the aforementioned drawbacks connected to the known systems.

Said aim being reached by the present invention, in that it relates to a hydraulic power system for a vehicle comprising:

a hydraulic fluid displacement pump capable of being operated by a thermal engine of said vehicle and provided with a suction port and a delivery port;

a reservoir for collecting said fluid, connected to said suction port;

actuator means of the hydraulic type, capable of controlling the direction of a pair of wheels of the vehicle;

a distribution unit of the said hydraulic fluid, provided with an inlet port, connected to said delivery port of said pump, a vent port connected to said fluid tank and two service ports connected to said actuator means, said distribution unit comprising a first distributor, operationally connected to said actuator means, and a second distributor, capable of being controlled by a steering wheel of said vehicle, said distributors being movable with respect to each other;

characterized in that said pump is of the variable displacement type, said system comprising means for adjusting said pump displacement as a function of the actual flow request from and to said actuator means, said adjusting means being capable of minimizing displacement of the said pump in the absence of flow request.

BRIEF DESCRIPTION OF THE DRAWINGS

The present invention will be better described by way of two non-limiting examples, with reference to the accompanying drawings, in which.

DETAILED DESCRIPTION OF THE INVENTION

Figure 1:
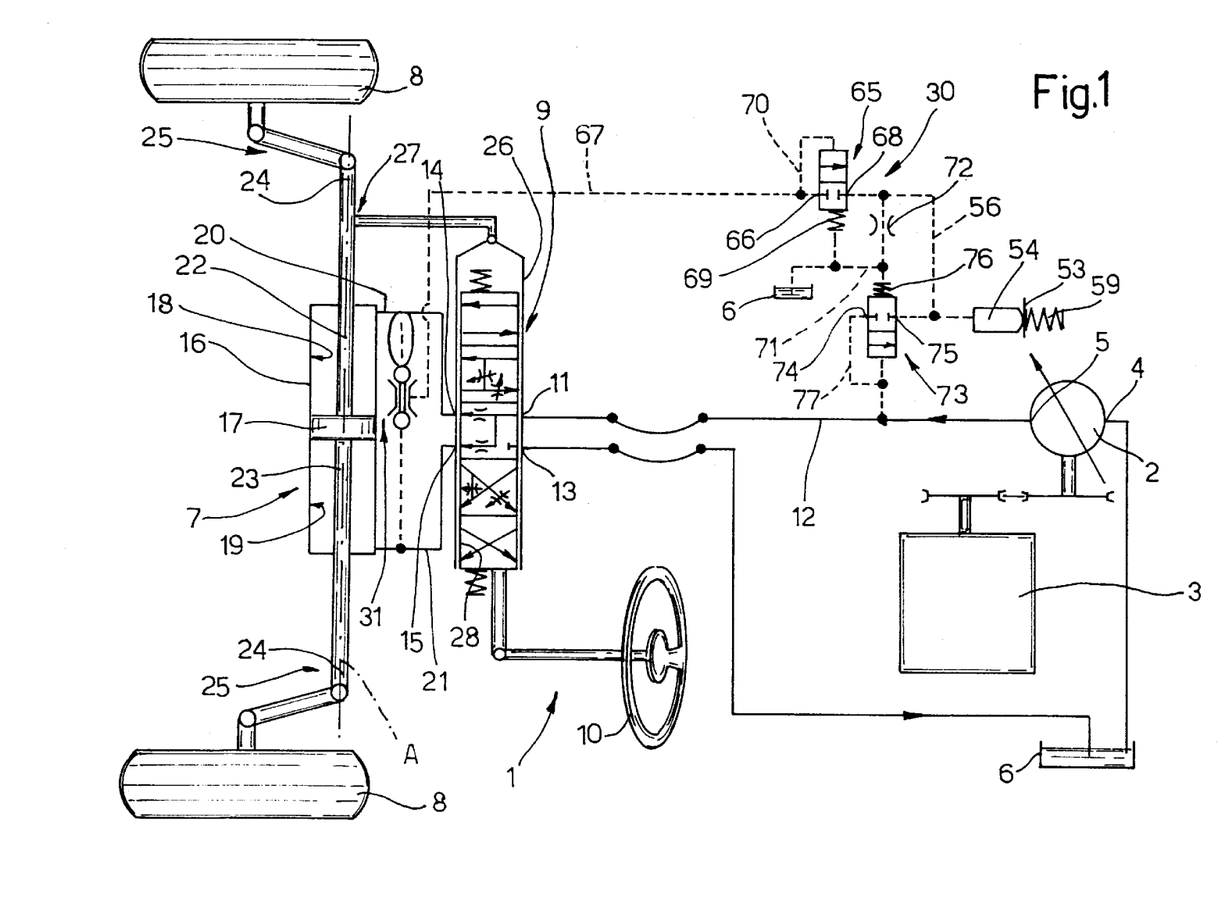
FIG. 1 shows a hydraulic scheme of a hydraulic power steering system for a vehicle according to the present invention.

With reference to FIG. 1, there is indicated, in its whole, with number 1 a hydraulic power steering system for a vehicle (not shown).

Figure 2:
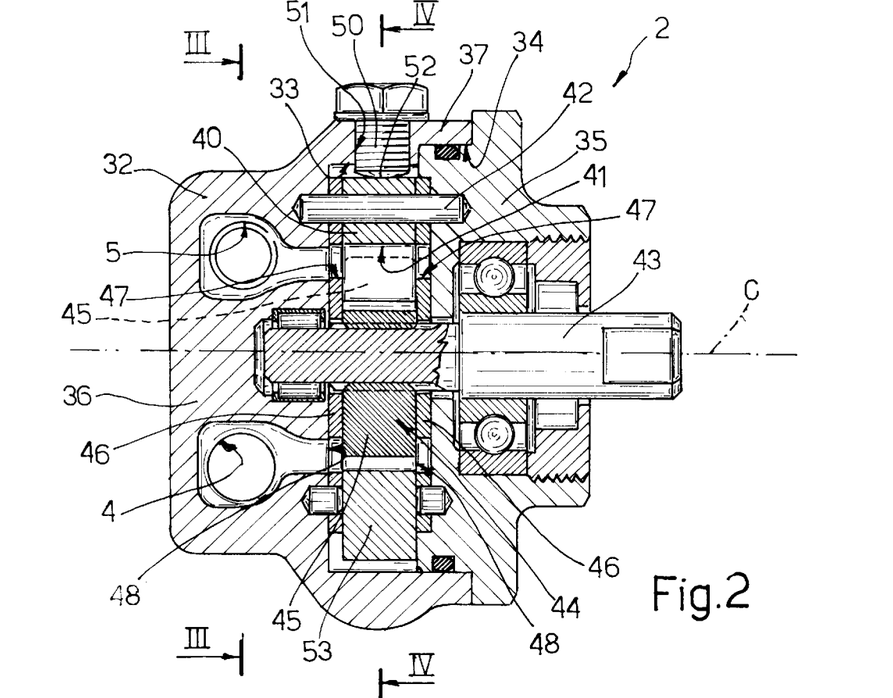
FIG. 2 shows an axial sectional view of a detail of the system of FIG. 1.

System 1 essentially comprises a displacement pump 2, operated by a thermal engine 3 of the vehicle and fitted with a suction port 4 and a pressurized oil delivery port 5 (FIGS. 2 and 3), a reservoir 6, for oil collection, connected to port 4 of pump 2, a double-acting hydraulic cylinder 7 capable of controlling direction of the vehicle front wheels 8. System 1 further comprises a distribution unit 9 controlled by a steering wheel 10 of the vehicle and comprising an inlet port 11 connected to port 5 of pump 2 through a delivery port 12, a vent port 13 connected to reservoir 6 and two service ports 14, 15.

Cylinder 7 comprises a liner 16 with an axis A, and a piston 17, mobile along axis A and defining with the walls of liner 16 two cylindrical chambers 18, 19, each whereof communicates with respective port 14, 15 through respective ducts 20, 21. Cylinder 7 further comprises two rods 22, 23, rigidly connected with opposite portions of piston 17, coaxial to liner 16 and each fitted with a free end 24, connected to respective wheel 8 through steering linkage 25, known per se, capable of converting the translation motion of piston 17 into a steering motion of wheels 8.

Unit 9 is capable of taking on, in a continuous manner, a plurality of different positions as a function of the displacement of steering wheel 10, so as to cause pressure unbalance in ducts 14, 15 and, consequently, in respective chambers 18, 19, thus causing piston 17 to translate along axis A. Unit 9 comprises an outer distributor 26, rotating about its axis B, perpendicular to axis A (FIG. 6), and controlled by the motion of piston 17 through a rack-pinion coupling 27, and an inner distributor 28, coaxial to distributor 26, operatively connected to steering wheel 10 and rotating therewith about axis B, with respect to distributor 26 itself.

According to the present invention, pump 2 is of the variable displacement type, and system 1 further comprises a device 30 for adjusting displacement of pump 2 and a flow request sensor 31 and to chambers 18, 19, capable of cooperating with said device 30 to adjust displacement of pump 2 as a function of the actual flow rate request, as will be explained hereinafter.

With reference to FIGS. from 1 to 4, pump 2 comprises a body 32, substantially cup-shaped, defining an inner cavity 33 fitted with an axial opening 34, closed in a sealed manner by a lid 35, secured to body 32; body 32 comprises a bottom wall 36 facing opening 34 and provided with ports 4, 5 and a side wall 37, substantially cylindrical in shape, with an axis C.

Pump 2 further comprises a stator 40, substantially cylindrical, defining an inner through cavity 41, the axis whereof is parallel to axis C. Stator 40 is housed in cavity 33 and is hinged to body 32 and to lid 35 by means of a pin 42, the axis whereof is parallel to axis C. Pump 2 further comprises a shaft 43, with an axis C, controlled by engine 3 and housed in a through manner inside cavity 41, and a rotor 44 splined to shaft 43 and provided with a plurality of blades 45, cooperating in a sealed manner, with their own outer end portion, against side wall 37 of cavity 41, so as to cause the latter to be split into a plurality of variable volume work chambers.

Pump 2 further comprises a pair of annular plates 46, perpendicular to axis C, connected to lid 35 and to wall 36 and inserted inside cavity 33 between said lid 35 and wall 36, so as to cooperate in a sealed manner, on opposite sides, with stator 40 and rotor 44. Plates 46 are capable of separating the suction and delivery areas of pump 2 and each thereof is fitted with a pair of through slits 47, 48 defining the suction and delivery ports of pump 2, and capable of causing port 4 and port 5 to communicate, respectively, with the chambers obtained between blades 45.

Body 32 comprises a screw 50, screwed into a threaded radial through hole 51, obtained in wall 37, adjacent pin 42, the axis whereof is perpendicular to the axis of pin 42; end portion 52 of screw 50 abuts on the outer rim of stator 40, so as to buck the hydraulic radial force acting on stator 40 when system 1 is pressurized.

Device 30 for adjusting displacement of pump 2 comprises a radial appendix 53 of stator 40, extending outwards in a cantilever manner from a portion of said stator 40, which is diametrically opposed pin 42.

Device 30 further comprises a hydraulic piston 54, slidable inside a substantially tangential housing 55 of body 32, connected (in a manner which is not shown) to a pilot duct 56, as described hereinafter, and acting against one face of appendix 53, so as to push stator 40 and cause it to rotate about the axis of pin 42 towards a minimum eccentricity position, with respect to rotor 44. Housing 55 further houses a spring 57, compressed between piston 54 and a closing plug 58 of said housing 55, so that piston 54 is maintained in steady contact with appendix 53.

Device 30 further comprises a garter spring 59 capable of exercising an elastic force on appendix 53, opposite to the action of piston 54, and prevailing with respect to that of spring 57, so as to thrust stator 40 towards a maximum eccentricity position, with respect to rotor 44.

More in particular, spring 59 is housed inside a substantially tangential hole 60 of body 32, the axis whereof is parallel to the axis of housing 55 and is compressed in an axial direction between a closing plug 61 of hole 60 and a thrust member 62, ogive shaped head 63 whereof cooperates with a conical seat 64, obtained in appendix 53.

Device 30 further comprises a two-position two-way pilot valve 65, normally closed, hydraulically piloted, provided (FIGS. 1 and 3) with an inlet 66 connected, through a duct 67, to sensor 31, and an outlet 68 connected to duct 56.

Figure 3:
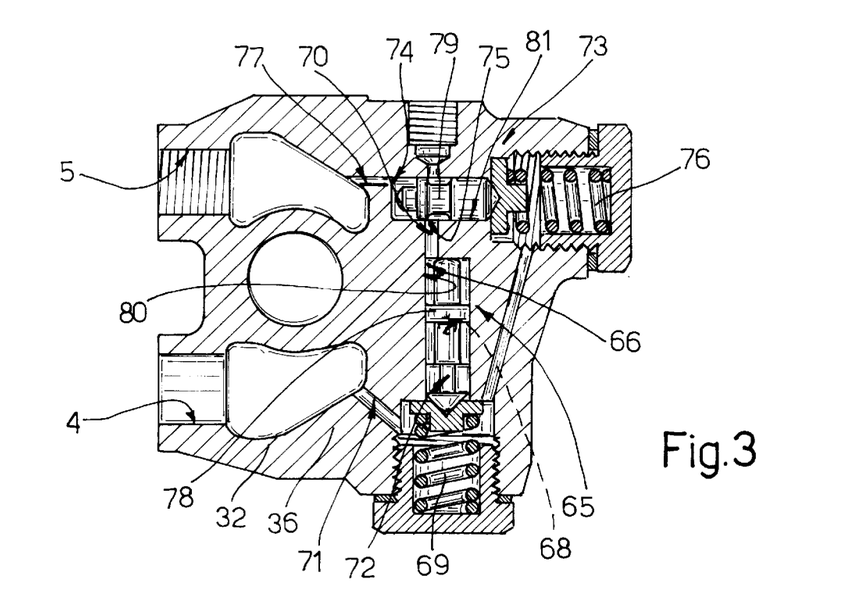
FIG. 3 shows a sectional view taken along line III—III of FIG. 2.
Figure 4:
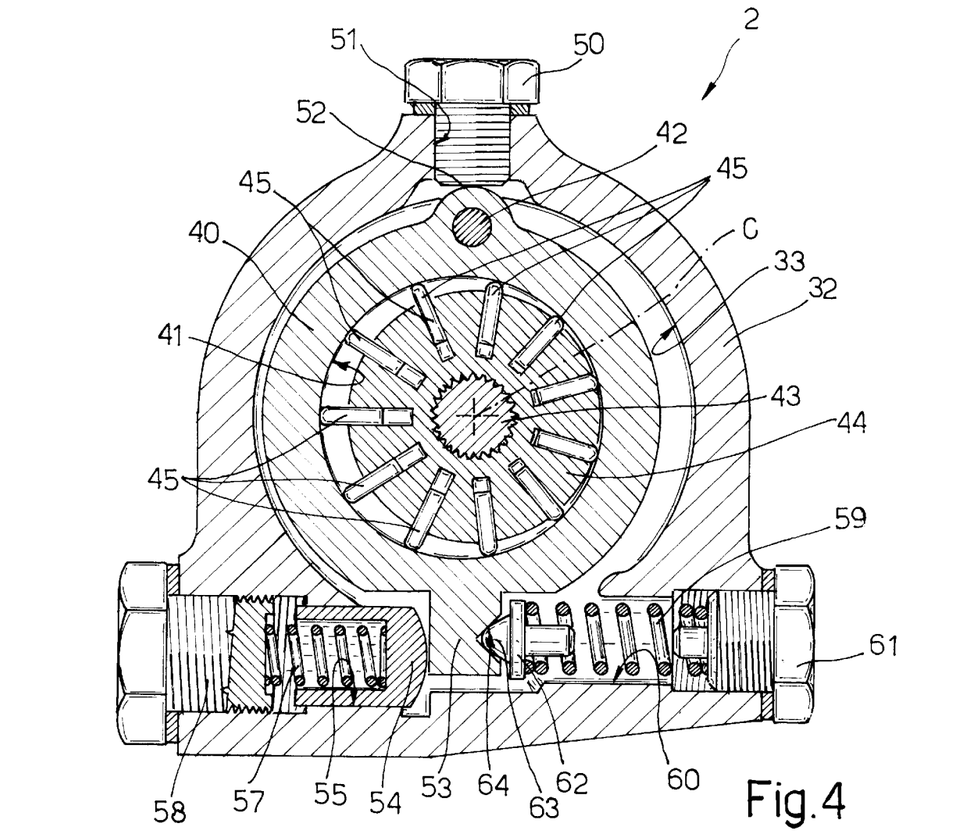
FIG. 4 shows an enlarged sectional view taken along line IV—IV of FIG. 2.

Valve 65 is normally maintained in a closed position by a spring 69, set to an equivalent pressure value P1, for example equal to 8 bars, and is caused to open by its own input pressure through a pilot duct 70 connected to duct 67.

Duct 56 is connected to reservoir 6 through a duct 71, fitted with a lamination orifice 72; duct 71 ensures depressurization of duct 56 when valve 65 is closed and orifice 72 dynamically uncouples duct 56 from reservoir 6, allowing for high response speed of device 30 for adjusting displacement of pump 2.

Finally, device 30 comprises a two-position two-way maximum pressure valve 73, normally closed, hydraulically piloted, inlet 74 whereof is connected to port 5 of pump 2 and outlet 75 whereof is connected to duct 56.

Valve 73 is normally maintained in a closed position by a spring 76, set to an equivalent pressure value P2, for example equal to 100 bars, and is caused to open by the delivery pressure of pump 2 through a pilot duct 77 connected to port 5 of pump 2.

FIG. 3 shows an embodiment of valves 65 and 73, integrated in body 32 of pump 2.

In particular, valves 65, 73 are provided with respective mobile members 78, 79, slidable inside respective cavities 80, 81 obtained in body 32, the axis whereof are perpendicular to each other. The duct, associated to valves 65, 73, consist in holes obtained in body 32 and are shown in FIG. 3 with the same reference numbers (56, 70, 77), as those used in the hydraulic scheme in FIG. 1.

Figure 5:
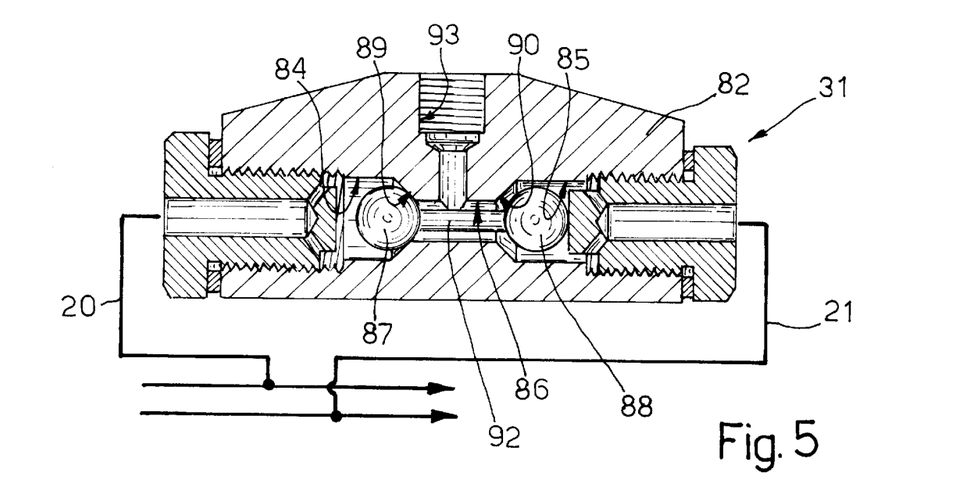
FIG. 5 shows a sectional view of a further detail of the system in FIG. 1.

With reference to FIGS. 1 and 5, sensor 31 is capable of comparing oil pressure values in ducts 20, 21 and of sending into duct 67 a pressure signal, equal to the lowest of the pressures in either duct 20 or 21.

In particular, sensor 31 comprises an outer casing 82, defining two chambers 84, 85 connected to each other by means of a hole 86 and each housing a ball 87, 88. Chambers 84, 85 are fitted, in connection with the mouths of hole 86, with respective sealing seats 89, 90 for balls 87, 88 and are connected to respective ducts 20, 21. In hole 86 there is housed with a radial clearance pin 92, which is inserted between balls 87, 88 and the length whereof is such, as to prevent balls 87, 88 from cooperating in a sealing manner at the same time with respective seats 89, 90. Finally, sensor 31 comprises an outlet 93, defined by a hole obtained in casing 82 and communicating with hole 86.

With reference to FIGS. from 6 to 12, distribution unit 9 comprises an outer casing 94, fitted with a through hole 95, coaxial to axis B, wherein there are housed in a rotating manner distributors 26, 28.

In particular, in the side walls of casing 94 there are obtained ports 11, 13, 14 and 15, consisting of radial holes arranged at different axial heights, with respect to each other, and communicating with hole 95.

Distributor 26 is inserted in a rotating manner inside hole 95 and, in turn, is provided with a through hole 96, having an axis B, engaged in a rotating manner by distributor 28.

Distributor 28 comprises a through hole 98, coaxial to axis B and housing a shaft 99 for connection to steering wheel 10, the latter being angularly coupled with distributor 28 in a known manner; shaft 99 comprises an intermediate portion 100, whose section is smaller than the end portions of said shaft 99 and defines with the walls of hole 98 an annular duct 101 connected to port 13, as described hereinafter.

Distributor 28 comprises a plurality of first and second axial grooves 102, 103, obtained on its own outer surface and angularly spaced apart in an alternate manner, with respect to each other, as well as a plurality of through radial ducts 104 connecting duct 101 to grooves 103. The angular width of grooves 103 is smaller than that of grooves 102; grooves 102, 103 (FIG. 11) have respective intermediate areas 102a, 103a with an enlarged, circular section.

Distributor 26 comprises three annular throats 105, 106, 107 obtained on the outer peripheral area of said distributor 26 and communicating with ports 11, 14, 15, respectively, and a plurality of first and second axial grooves 108, 109 obtained on its inner surface and angularly spaced apart, with respect to each other, in an alternate manner; grooves 108, 109 have the same angular width and are separated from each other by respective sealing surfaces 110, the angular width whereof is slightly smaller than the maximum angular width of grooves 102 in connection with area 102a.

Distributor 26 is further provided with a plurality of first radial through ducts 111, connecting throat 106 to grooves 108, a plurality of second radial through ducts 112, connecting throat 107 to grooves 109, and a third plurality of radial through ducts 113, communicating with throat 105 and obtained in connection with alternate sealing surfaces 110.

As clearly shown in FIGS. from 6 to 12, ports 11, 13, 14 and 15 can be connected to each other, in a continuous manner, varying the relative position of distributors 26, 28 and, consequently, the area of the through sections between grooves 102, 103 of distributor 28 and grooves 108, 109 of distributor 26.

Figure 6:
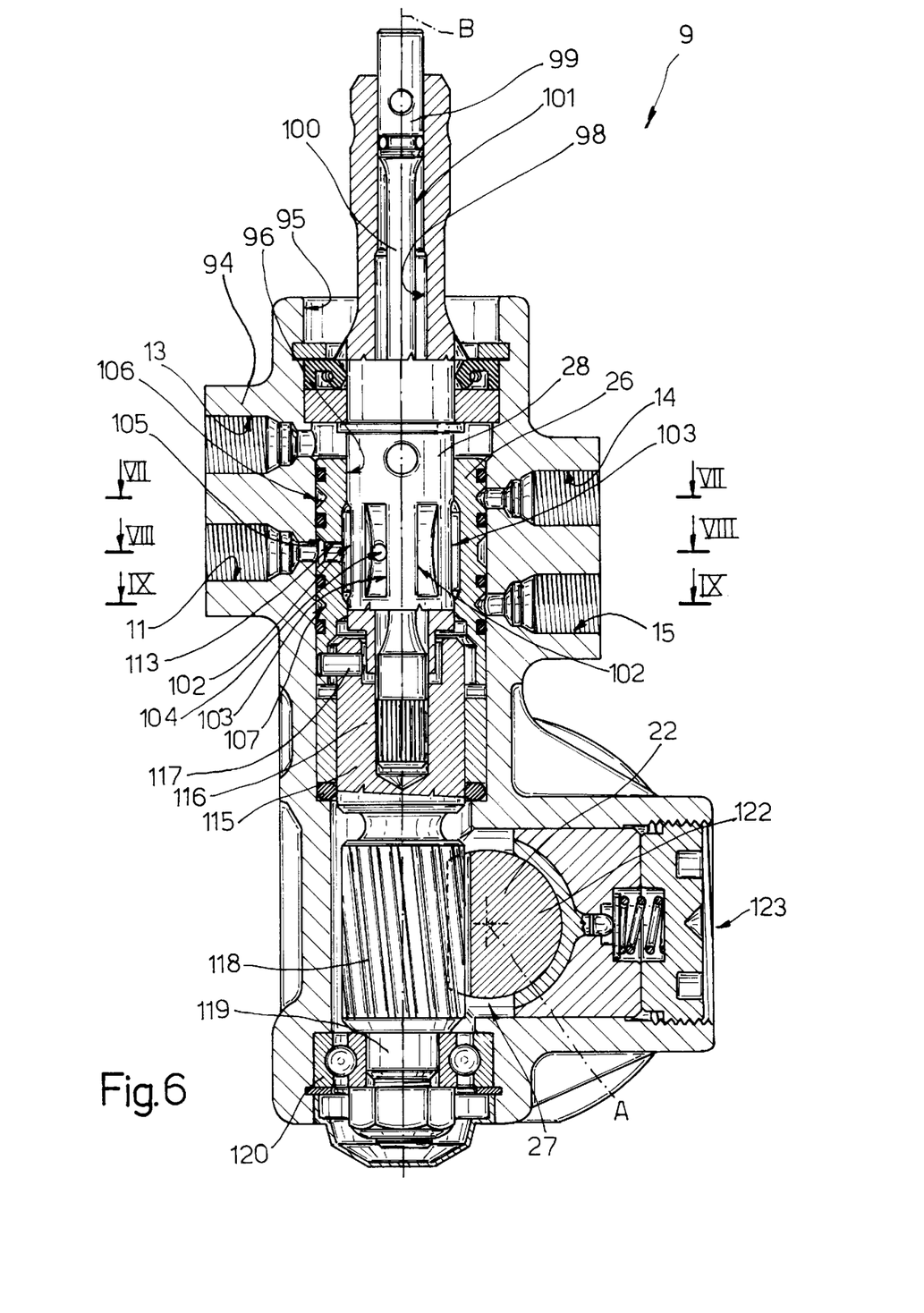
FIG. 6 shows an axial sectional view of a further detail of the system in FIG. 1.
Figures 7, 8, 9:
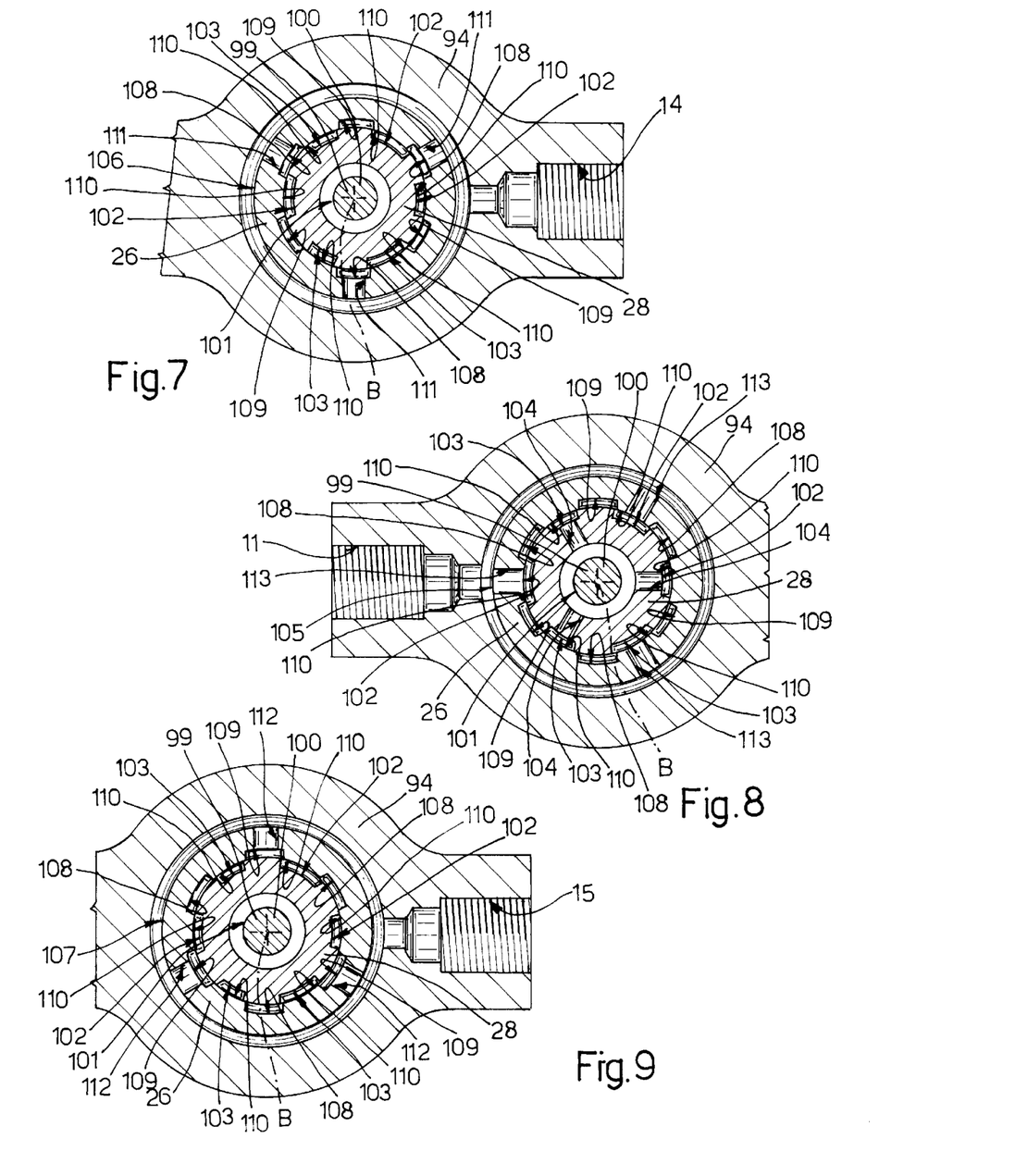
FIG. 7 shows a sectional view taken along line VII—VII in FIG. 6.
FIG. 8 shows a sectional view taken along line VIII—VIII of FIG. 6.
FIG. 9 shows a sectional view taken along line IX—IX of FIG. 6.
Figure 10:
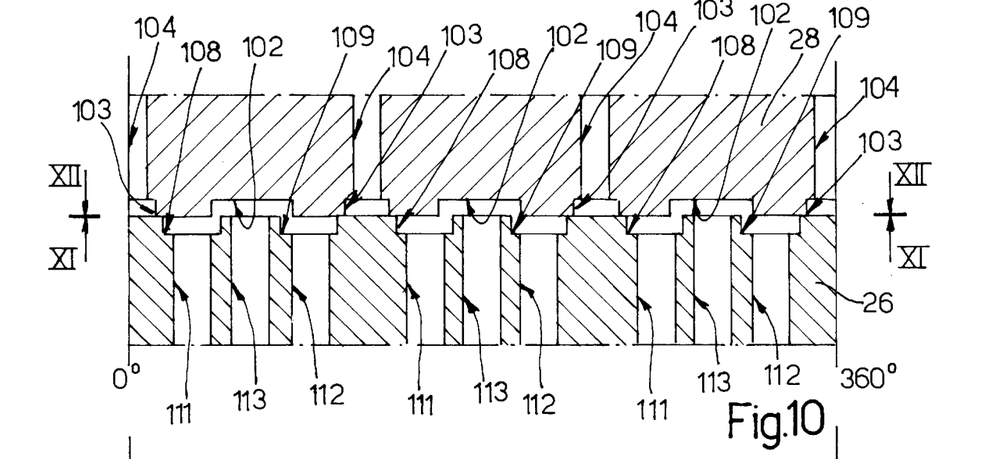
FIG. 10 shows a schematic sectional view of a detail of broken-away part in FIG. 6, developed in the plane.
Figure 11:
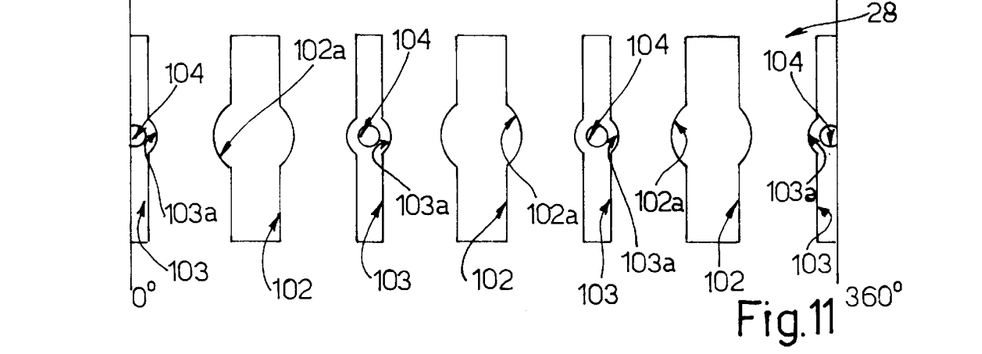
FIG. 11 is a sectional view taken along line XI—XI of FIG. 10.
Figure 12:
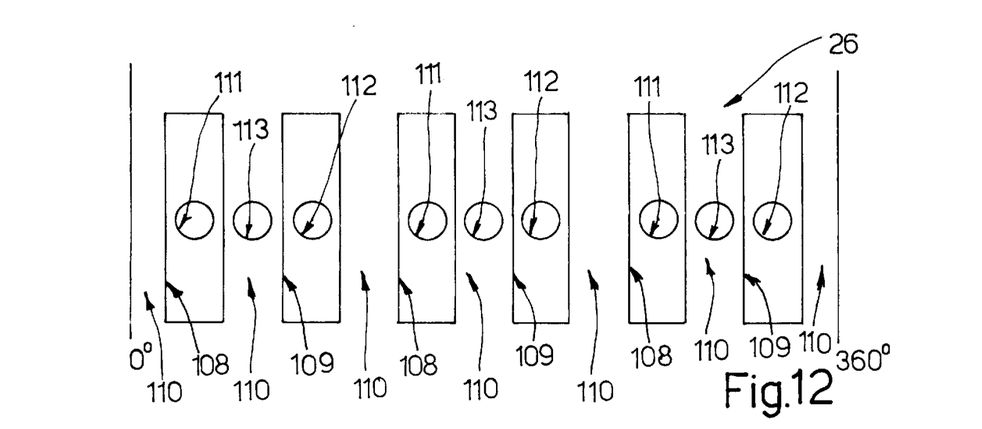
FIG. 12 is a sectional view taken along line XII—XII of FIG. 10.

With reference to FIG. 6, coupling 27 between distributor 26 and rod 22 comprises a shaft 115, inserted in a rotating manner into hole 95, end portion 116 whereof being engaged in hole 96 of distributor 26 and being angularly coupled with said distributor 26 through a radial pin 117. Shaft 115 further comprises an intermediate toothed portion 118 and an opposite end portion 119, radially and axially supported, with respect to casing 94, by means of bearing 120.

Coupling 27 further comprises a rack 122, obtained on an intermediate portion of rod 22, engaging portion 118 of shaft 115 and maintained in such an engaged position with said portion 118 by means of a thrust device 123, known per se.

Operation of system 1 is described starting from an initial condition, wherein engine 3 is off, steering wheel 10 is still and system 1 is depressurized. In such an initial condition, valve 65 is closed and pilot duct 56 is connected to reservoir 6 through opening 72 of duct 71. Therefore, the force exercised by spring 59 of device 30 for adjusting displacement of pump 2 prevails over the thrust by piston 54 and maintains stator 40 in the maximum eccentricity position and, consequently, in the maximum displacement position of pump 2.

Upon starting up of engine 3, pump 2 discharges a pressurized oil flow rate towards port 11 through duct 12. Unit 9 is in a centered position, wherein port 11 is connected to ports 14 and 15 and port 13 is closed. In particular, in the centered position, the relative position of distributors 26, 28 is such, that ducts 113 of distributor 26 face grooves 102 of distributor 28; said grooves 102 communicate with grooves 108 and 109 of distributor 26 by means of narrow through ports defined by areas 102a (FIG. 8), in this manner connecting ports 11, 14 and 15, and sealing surfaces 110 isolate grooves 103 from grooves 108, 109 of distributor 26, preventing port 13 from communicating with ports 11, 14 and 15, according to the hydraulic scheme in FIG. 1.

Therefore, chambers 18, 19 are both pressurized at the same pressure and, consequently, piston 17 is maintained in a central position inside cylinder 7. Also chambers 84, 85 of sensor 31 measure the same pressure value and, since balls 87, 88 are prevented from closing simultaneously by pin 92, such a pressure value is to be measured in duct 67, as well. When pressure inside chambers 18, 19 of cylinder 7 and, consequently, in ducts 67, 70, exceeds value P1, movable member 78 displaces, overcoming the force exercised by spring 69 in the opposite direction, thus opening the connection between inlet 66 and outlet 68 and, consequently, between duct 67 and duct 56.

At this point, pressurized oil flows through duct 56 into seat 55 and thrusts piston 54 against appendix 53; as pressure grows in duct 56, the action of piston 54 causes a gradual deformation of spring 59, thus leading to a reduction in the displacement of pump 2. In a steady state and without acting on steering wheel 10, displacement of pump 2 is maintained at a minimum value, such as to compensate circuit blow-by, in particular through orifice 72.

When engine 3 is on, by steering wheel 10, for example in a clockwise direction in FIG. 1, distributor 28 rotates about axis B, so as to progressively open the connection between port 11 and port 14, to progressively close the connection between port 11 and port 15, and to progressively open the connection between port 13 and port 15.

Therefore, duct 20 and respective chamber 18 of cylinder 7 are pressurized, while duct 21 and respective chamber 19 of said cylinder 7 are depressurized. Consequently, piston 17 displaces, thus causing wheels 8 to be steered, in the case in point in a rightwise direction. Translation of rod 22 causes, through coupling 27, a mechanical rotation of distributor 26, which rotates in such a way, as to "chase" distributor 28 and, in particular, to move back to a relative centered position with respect thereto, when steering wheel 10 comes to a halt; obviously, if steering wheel 10 comes to a halt in a rotated position, the relative position between distributors 26, 28 is centered, but their position is rotated, with respect to casing 94.

To each value of the angular displacement between distributors 26 and 28, the relative position whereof is variable in a continuous manner, there correspond previously fixed values of the connection sections among ports 11, 13, 14 and 15; such connection sections, therefore, depend on the speed of rotation of steering wheel 10, in that the latter determines the angular displacement between distributor 26 and distributor 28: indeed, a high speed of rotation of steering wheel 10 causes a delay in the mechanical reaction, which tends to bring distributors 26, 28 back to their relative centered position.

In particular, when the speed of rotation of steering wheel 10 is high, the connection section between port 11 and port 15 is smaller than the connection section between port 13 and said port 15, and viceversa, if the steering velocity is low.

Sensor 31 conveys to duct 67 the pressure value in ducts 20 and 21, whichever the lower, in the case in point, the pressure in duct 21. Since duct 21 is not directly connected to reservoir 6, but it is connected thereto further to lamination caused by distribution unit 9, said pressure value is normally higher than pressure P1 and is therefore conveyed by valve 65 to duct 56. As pressure in duct 56 varies, also the displacement and, consequently, the flow rate of pump 2 changes; on the grounds of the foregoing, said pressure value decreases as the angular displacement between distributor 26 and distributor 28 increases, i.e., as the speed of rotation of steering wheel 10 increases. Therefore, the higher the steering speed, the bigger the displacement of pump 2, which spring 59 tends to maintain at maximum values, against action of pressure in duct 56.

Only when the steering speed is such, as to bring distribution unit 9 into one of the extreme positions, wherein either duct 20 or 21 (for example duct 20 when steering in a rightwise direction) is directly connected to delivery of pump 2 and either duct 21 or 20 (for example duct 21) is directly connected to reservoir 6, does pressure in duct 67 lower below value P1. Being this the case, valve 65 closes and, therefore, duct 56 depressurizes through orifice 72, thus causing pump 2 to revert to maximum displacement conditions.

If, in such a condition, pressure in delivery duct 12 reaches maximum pressure calibration value P2 of valve 73, said valve 73 opens and connects duct 56 to delivery duct 12. Pump 2 is therefore brought back into minimum displacement position, however maintaining duct 12 at maximum predetermined pressure value P2.

By rotating steering wheel 10 anticlockwise in FIG. 1, operation of system 1 is similar, the only difference being represented by the fact that, in this case, chamber 19 of cylinder 7 is pressurized and chamber 18 of cylinder 7 is depressurized.

With reference to FIGS. 13 to 18, there is shown an alternative embodiment of a hydraulic power steering system for a vehicle according to the present invention and indicated, in its whole, by number 1'; such a system is described hereinafter only as concerns any differences thereof with respect to system 1, the same numbers indicating such parts, as are either identical or corresponding to the ones described hereinabove.

Figure 13:
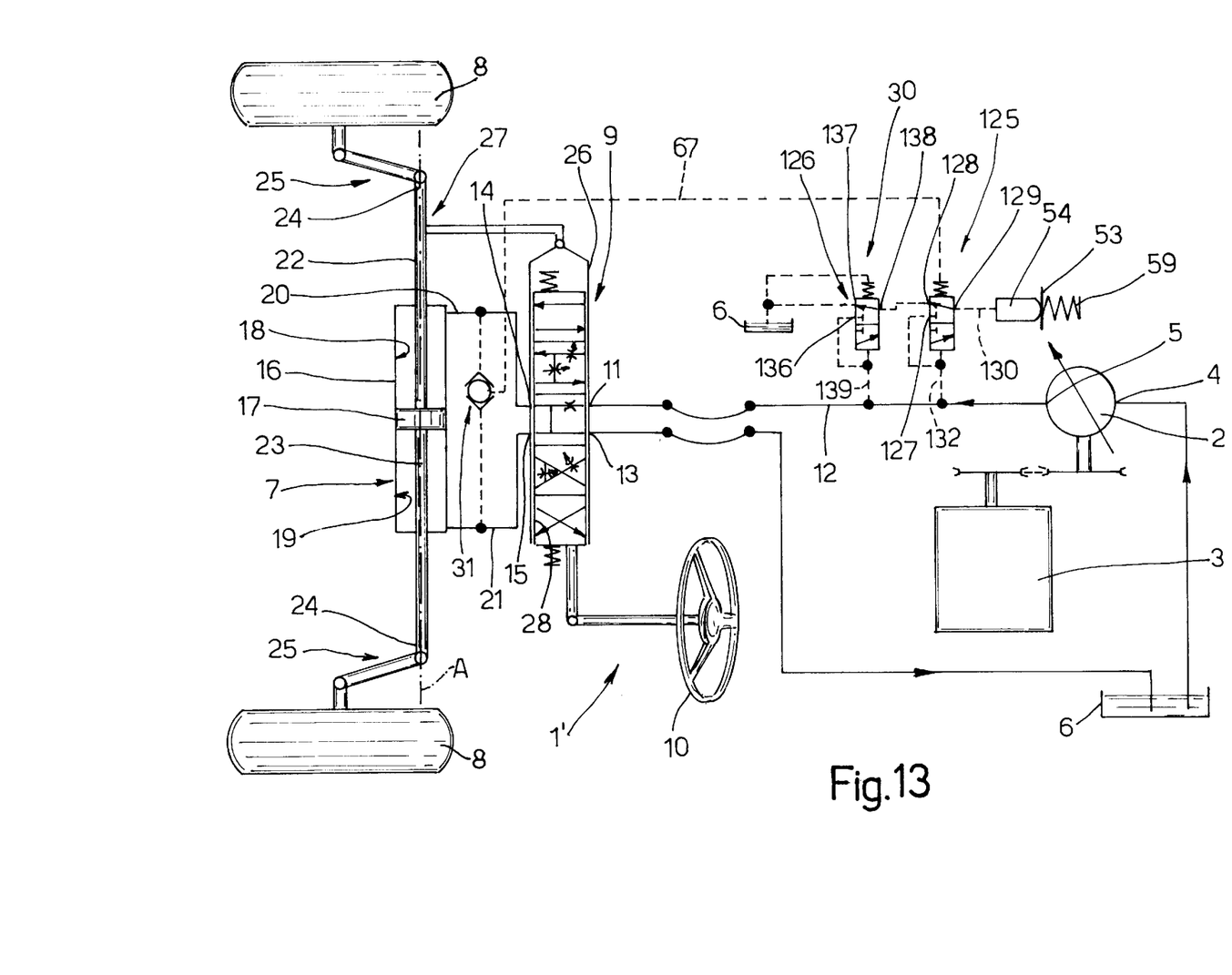
FIG. 13 shows a diagram of an alternative embodiment of a hydraulic power steering system for a vehicle according to the present invention.
Figure 14:
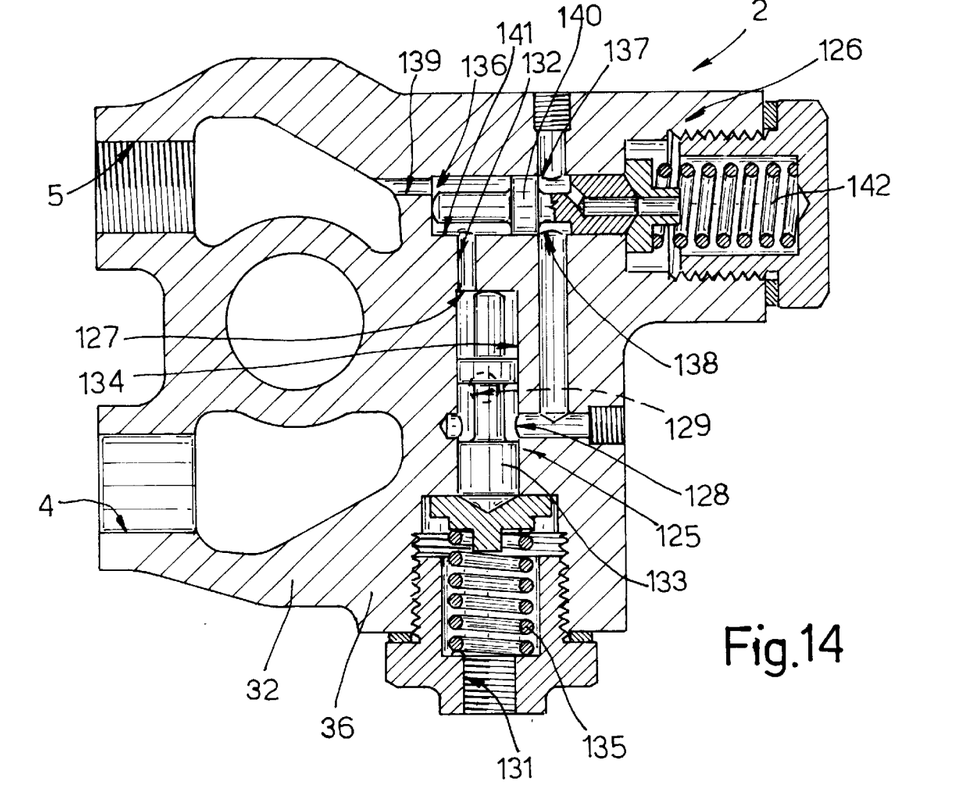
FIG. 14 shows a sectional view of a detail of the system in FIG. 13.

With reference to FIGS. 13 and 14, system 1' comprises a distribution unit 9 of the open-center type, a flow request sensor 31 capable of comparing pressure in ducts 20, 21 and of conveying to duct 67 the higher value thereof, and a device 30 for adjusting displacement of pump 2, comprising a pilot valve 125 and a maximum-pressure valve 126, both of the three-way two-position type.

Valve 125 comprises an inlet 127 connected to delivery duct 12 of pump 2, an outlet 128 connected to valve 126, and a service port 129 connected to seat 55 of piston 54 through a duct 130; valve 125 further comprises a first pilot duct 131 connected to duct 12, and a second pilot duct 132 connected to duct 67.

Valve 125 (FIG. 14) comprises a movable slide member 133 slidable inside a cavity 134, obtained in body 32 of pump 2. Movable member 133 is slidable between a first position, wherein port 129 is connected to outlet 128 and inlet 127 is closed, and a second position, wherein port 129 is connected to inlet 127 and outlet 128 is closed.

A spring 135, set to an equivalent pressure value P1 for example 8 bars, tends to maintain movable member 133 in the said first position. Movable member 133 is further subjected to the pressures in ducts 67 and 12, said pressures acting in the same or in the opposite direction, respectively, with respect to the action of spring 135.

Valve 126 has an inlet 136 connected to delivery duct 12, an outlet 137 connected to reservoir 6, and a service port 138 connected to outlet 128 of valve 125; valve 126 further comprises a pilot duct 139 connected to duct 12.

Valve 126 (FIG. 14) comprises a movable slide member 140 slidable inside a cavity 141, obtained in body 32 of pump 2 and perpendicular to cavity 134. Movable member 140 is slidable between a first position, wherein port 138 is connected to outlet 137 and inlet 136 is closed, and a second position, wherein port 138 is connected to inlet 136 and outlet 137 is closed.

A spring 142, set to an equivalent pressure value P2, for example 100 bars, normally maintains movable member 140 in the said first position. Movable member 140 is further subjected to the pressure in duct 12, said pressure acting in the opposite direction to the action of spring 142.

In FIG. 14 there is shown a favorite embodiment of valves 125, 126 and respective connections between said valves 125, 126 and the other components of system 1'.

Figure 15:
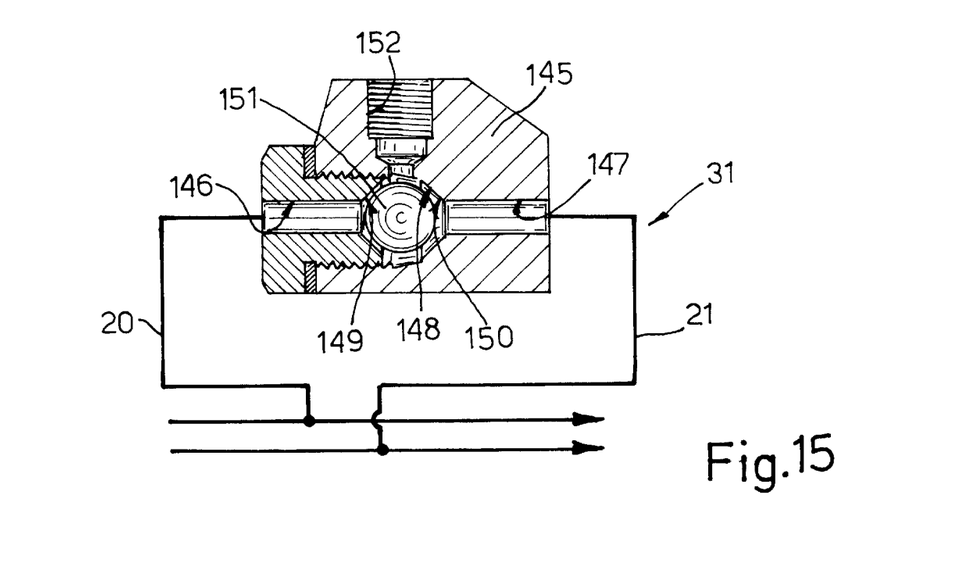
FIG. 15 shows a sectional view of a further detail of the system in FIG. 13.

With reference to FIG. 15, flow request sensor 31 comprises a casing 145, a first inlet 146 whereof is connected to duct 20 and a second inlet 147 whereof is connected to duct 21; inlets 146, 147 are coaxial with respect to each other and communicate with an inner chamber 148 through respective openings defining respective sealing seats 149, 150 for a ball 151, housed with a clearance inside chamber 148. Sensor 31 further comprises an outlet 152, communicating with chamber 148 in an intermediate position, with respect to sealing seats 149, 150.

Ball 151 is movable inside chamber 148 under the action of the pressures acting at inlets 146, 147 and is capable of cooperating in a sealed manner against seat 149, 150 associated to inlet 146 or 147, at the lower pressure, thus allowing for connection of outlet 152 to either inlet 147 or 146 at the higher pressure.

Figure 16:
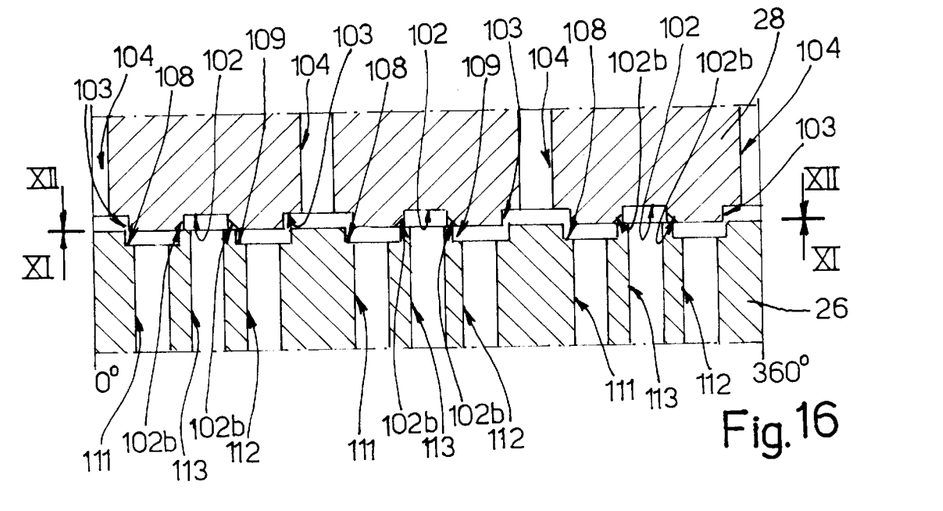
FIG. 16 shows a schematic sectional view of a further detail of the system in FIG. 13, developed in plane.
Figure 17:
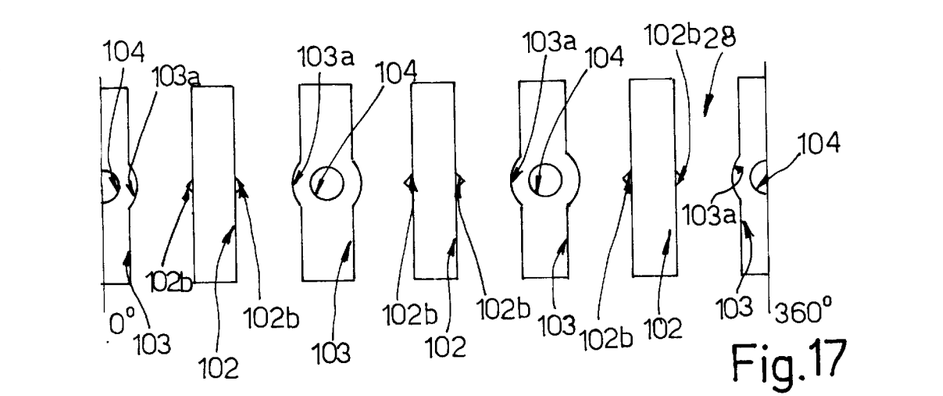
FIG. 17 is a sectional view taken along line XVII—XVII in FIG. 16.
Figure 18:
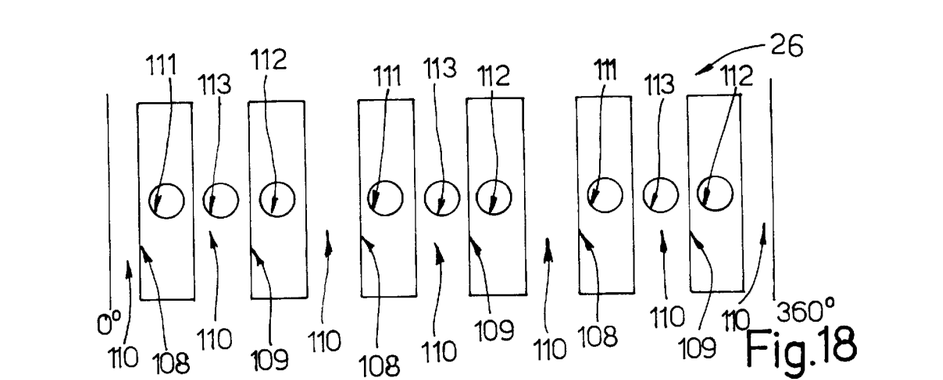
FIG. 18 is a sectional view taken along line XVIII—XVIII of FIG. 16.

With reference to FIGS. from 16 to 18, distribution unit 9 comprises a distributor 26, identical to the one described with reference to system 1, and a modified distributor 28 comprising a plurality of first and second axial grooves 102, 103 obtained on its outer surface and angularly spaced apart with respect to each other in an alternate manner. Grooves 102 are provided with respective V-shaped side notches 102b, locally increasing the width thereof; grooves 103 communicate with reservoir 6, are provided with an intermediate enlarged area 103a and their width is slightly bigger than that of grooves 102.

In this case, the width of sealing surfaces 110 is slightly smaller than the maximum width of grooves 102, 103, as measured in connection with notches 102b and enlarged areas 103a, respectively, but larger than the width of grooves 102, 103 in the remaining portions.

Operation of system 1' is similar to that of system 1 and is described starting from an initial condition, wherein engine 3 is off, steering wheel 10 is still and system 1' is depressurized. In such an initial condition, valve 125 is maintained by spring 135 in the position wherein service port 129 is connected to outlet 128 and inlet 127 is closed, duct 67 is connected, through valve 126, to reservoir 6, duct 130 is depressurized and, therefore, stator 40 is maintained by spring 59 in the maximum eccentricity position and, consequently, in the maximum displacement position of pump 2.

Upon starting up of engine 3, pump 2 discharges a pressurized oil flow rate towards port 11 through duct 12. Unit 9 is in a centered position, wherein port 11 is connected to ports 14 and 15 by means of narrow through ports, defined by notches 102b, and port 13 is also connected to ports 14 and 15 by means of through ports between grooves 103 of distributor 28 and grooves 108, 109 of distributor 26.

In this case, the oil sent by pump 2 undergoes a pressure drop through notches 102b and flows, through ports 14, 15, into chambers 18, 19, respectively, and, through port 13, towards reservoir 6. Therefore, chambers 18, 19 of cylinder 7, inlets 146, 147 of sensor 31 and duct 67 are depressurized.

When oil pressure inside delivery duct 12 of pump 2 and, consequently, inside pilot duct 132 of valve 125, exceeds value P1, movable member 133 displaces, overcoming the force exercised by spring 135 in the opposite direction, and opening the connection between port 129 and inlet 127 and, consequently, between duct 130 and duct 12, and closing outlet 128. Pressurized oil can therefore flow through duct 130 into seat 55 and thrust piston 54 against appendix 53 to progressively reduce displacement of pump 2, in a similar manner to the one described in connection with operation of system 1. In a steady state and without acting on steering wheel 10, displacement of pump 2 is maintained at a minimum value, such as to compensate circuit blow-by, in particular through notches 102b.

When engine 3 is on, by steering wheel 10, for example in a clockwise direction in FIG. 1, distributor 28 rotates about axis B, so as to progressively close connection between port 11 and ports 13 and 15, to progressively increase the connection section between said port 11 and port 14.

Therefore, duct 20 and respective chamber 18 of cylinder 7 are pressurized, while duct 21 and respective chamber 19 of said cylinder 7 are depressurized. Similarly to the description supplied in connection with operation of system 1, piston 17 displaces, thus causing wheels 8 to be steered in a rightwise direction and, through coupling 27, the rotation of distributor 26 about its axis B, in such a way, as to move back to a relative centered position with respect to distributor 28, when steering wheel 10 comes to a halt.

Sensor 31 conveys to duct 67 the pressure value in ducts 20 and 21, whichever the higher, in the case in point, the pressure in duct 20. Such a pressure bucks the pressure acting on delivery duct 12 of pump 2 and is normally lower than the latter. Therefore, valve 125 allows for connection of duct 12 to duct 130, displacement of pump 2 being adjusted by the oil pressure in duct 12 and, consequently, by the actual flow rate requests in chambers 18, 19 of cylinder 7, further to the actions carried out on steering wheel 10.

When the steering speed is such, as to bring distribution unit 9 into one of the extreme positions, wherein one of ducts 20, 21 (for example duct 20 when steering in a rightwise direction) is directly connected to delivery of pump 2 and the other duct 21, 20 (for example duct 21) is directly connected to reservoir 6, pressure in duct 67 is equal to pressure in duct 12. Being this the case, valve 125 takes up the position wherein service port 129 is connected to outlet 128 and inlet 127 is closed and, therefore, duct 130 is connected to reservoir 6 and depressurizes, thus causing pump 2 to revert to maximum displacement conditions.

If, in such a condition, pressure in delivery duct 12 reaches maximum pressure calibration value P2 of valve 126, said valve 126 takes up the position wherein service port 138 is connected to inlet 136 and outlet 137 is closed, connecting duct 12 to duct 130. Pump 2 is therefore brought back into minimum displacement position, however maintaining duct 12 at maximum predetermined pressure value P2.

By rotating steering wheel 10 anticlockwise in FIG. 1, operation of system 1 is similar, the only difference being represented by the fact that, in this case, chamber 19 of cylinder 7 is pressurized and chamber 18 of cylinder 7 is depressurized.

An examination of the characteristics of the hydraulic power steering system according to the present invention clearly points out the advantages thereof.

In particular, in hydraulic power steering system 1, 1', described hereinabove, energy dissipation is quite limited since it is possible to adjust the displacement of pump 2 as a function of the actual flow rate requests from chambers 18, 19 of cylinder 7 and, therefore, as a function of the steering speed of front wheels 8 of the vehicle.

The variance between the power absorbed by pump 2 and the power used by unit 9 and by cylinder 7, and, as a consequence thereof, the quantity thereof dissipated and converted into heat, is quite a small one. Which allows for better operation of the hydraulic power steering system and, therefore, of the vehicle, with limited oil overheating and longer life of both system's components and oil.

Finally, systems 1 and 1' can undergo any such modifications and alterations, as fall within the scope of protection of the claims.

In particular, variable displacement pump 2 could be of any type whatsoever, for example of the radial or axial piston type.

Therefore the present invention is, of course, in no way restricted to the specific disclosure of the specification and drawings, but also encompass any modifications within the scope of the appended claims.

I claim:

1. A hydraulic power steering system for a vehicle, comprising:
   a hydraulic fluid displacement pump that is adapted to be operated by a thermal engine of said vehicle, said pump being a variable displacement pump and being provided with a suction port and a delivery port;
   a reservoir for collecting system fluid, said reservoir communicating with said suction port of said pump;
   hydraulic actuator means for controlling the direction of a pair of wheels of said vehicle;
   a distribution unit for said hydraulic fluid, said distribution unit being provided with an inlet port that communicates with said delivery port of said pump, a vent port that communicates with said reservoir, and two service ports that communicate with said actuator means, said distribution unit further comprising a first distributor that is operationally connected to said actuator means, and a second distributor that is adapted to be controlled by a steering wheel of said vehicle, said first and second distributors being movable relative to one another; and
   means for adjusting displacement of said pump as a function of an actual flow request from and to said actuator means, said means for adjusting displacement being adapted to minimize displacement of said pump in the absence of a flow request.

2. A system according to claim 1, further comprising a flow request sensor means that is provided with a pair of inlets that communicate with said service ports of said distribution unit, and is also provided with an outlet that communicates with said means for adjusting displacement of said pump, said sensor means comprising selector means for selectively connecting said outlet of said sensor means to said inlets thereof in response to a comparison of pressures at said inlets.

3. A system according to claim 2, wherein said means for adjusting displacement of said pump comprises an actuator unit that is adapted to vary displacement of said pump, and a pilot valve, that communicates with said actuator unit by means of a first duct and is adapted to cooperate with said sensor means for controlling said actuator unit.

4. A system according to claim 3, wherein said actuator unit comprising a hydraulic actuator that is adapted to minimize displacement of said pump, and at least one spring that is adapted to exercise an elastic force opposite to the action of said hydraulic actuator to maintain displacement of said pump at a maximum value.

5. A system according to claim 4, wherein said means for adjusting displacement of said pump comprises a maximum pressure valve that is capable of allowing said delivery port of said pump to communicate with said hydraulic actuator when pressure in conjunction with said delivery port is greater than a first threshold value that is equivalent to a maximum allowed pressure in conjunction with said delivery port.

6. A system according to claim 2, wherein said first and second distributors, in a relative centered position corresponding to a stop condition of said steering wheel, comprise closing means for said vent port of said distribution unit, and narrow-sectioned means for providing communication between said inlet port and said service ports.

7. A system according to claim 6, wherein said selector means of said flow request sensor means are adapted to connect said outlet of said sensor means to that one of said inlets of said sensor means that is at the lower pressure.

8. A system according to claim 3, wherein said pilot valve is connected by means of a second duct to said sensor means, and wherein said pilot valve is adapted to allow communication between said first duct and said second duct when pressure in said second duct exceeds a second threshold value.

9. A system according to claim 3, wherein said first duct furthermore communicates with said reservoir via a third duct that is provided with a narrow section by means of an orifice.

10. A system according to claim 3, wherein said first and second distributors, in a relative centered position corresponding to a stop condition of said steering wheel, comprise narrow section means for connecting said inlet port of said distribution unit to said vent ports and said service ports thereof, and further comprise means for connecting said vent port to said service ports.

11. A system according to claim 10, wherein said selector means of said flow request sensor means are adapted to connect said outlet of said sensor means to that inlet thereof that has a higher pressure.

12. A system according to claim 10, wherein said pilot valve is provided with an inlet that is connected to said delivery port of said pump, and an outlet that is connected to said reservoir by means of said maximum pressure valve, and a port that is connected to said hydraulic actuator by means of said first duct, said pilot valve being furthermore connected to said flow request sensor means by means of a second duct, said outlet of said pilot valve being adapted to be connected to said first duct, and said inlet thereof being adapted to be closed when pressure in conjunction with said delivery port is less than a second threshold value plus the pressure value in said second duct, said inlet of said pilot valve being adapted to be connected to said first duct, and said outlet thereof being adapted to be closed when pressure in conjunction with said delivery port is greater than said second threshold value plus the pressure value in said second duct.

13. A system according to claim 1, wherein said first distributor is an outer distributor that rotates about a first axis, and wherein said second distributor is an inner distributor that is coaxial to said outer distributor and rotates about said first axis, and wherein said inlet port, said vent port, and said service port of said distribution unit are radially connected at different axial heights to said first and second distributors.

14. A system according to claim 13, wherein said inner distributor is provided with an inner annular duct that is coaxial to said first axis and communicates with said vent port, a plurality of first and second axial grooves that are disposed on an outer surface of said inner distributor and are angularly spaced apart in an alternate manner relative to one another, and a plurality of first radial through ducts that connect said inner annular duct to said first grooves, and wherein said outer distributor comprises a first, second, and third annular throat disposed on an outer peripheral area thereof and communicating with said inlet and service ports respectively, a plurality of third and fourth axial grooves disposed on an inner surface thereof and annularly spaced apart relative to one another in an alternate manner, and a plurality of second radial through ducts connecting said second throat to said third grooves, a plurality of third radial through ducts connecting said third throat to said fourth grooves, and a plurality of fourth radial through ducts that communicate with said first throat, said inlet, service and vent ports being adapted to be connected to one another in a continuous manner varying the relative position of said first and second distributors and, consequently, a through section area between said first and second grooves of said inner distributor and said third and fourth grooves of said outer distributor.

15. A system according to claim 1, wherein s aid pump is a radial-blade pump.

* * * * *